United States Patent
Lai et al.

(10) Patent No.: US 9,046,960 B2
(45) Date of Patent: Jun. 2, 2015

(54) LIGHT PATH ADJUSTING ASSEMBLY AND OPTICAL TOUCH DEVICE USING THE SAME

(75) Inventors: Hung-Ching Lai, Hsinchu (TW); Cheng-Nan Tsai, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 324 days.

(21) Appl. No.: 13/443,827

(22) Filed: Apr. 10, 2012

(65) Prior Publication Data

US 2012/0305776 A1    Dec. 6, 2012

(30) Foreign Application Priority Data

Jun. 2, 2011 (TW) .............................. 100119437 A

(51) Int. Cl.
*G06M 7/00* (2006.01)
*G06F 3/042* (2006.01)

(52) U.S. Cl.
CPC ...................................... *G06F 3/042* (2013.01)

(58) Field of Classification Search
CPC ....................................................... G01V 8/20
USPC .................................................. 250/221, 239
See application file for complete search history.

(56) References Cited

U.S. PATENT DOCUMENTS

| | | | | |
|---|---|---|---|---|
| 4,769,535 A | * | 9/1988 | Sasaki et al. | 250/221 |
| 4,988,180 A | * | 1/1991 | Gabas | 359/844 |
| 6,369,380 B1 | * | 4/2002 | Hirai | 250/239 |
| 7,589,317 B2 | * | 9/2009 | Okano | 250/239 |
| 2001/0035923 A1 | | 11/2001 | Cha et al. | |
| 2010/0309144 A1 | | 12/2010 | Tsai et al. | |

FOREIGN PATENT DOCUMENTS

| | | |
|---|---|---|
| CN | 2779440 Y | 5/2006 |
| CN | 101996003 A | 3/2011 |
| CN | 102033664 A | 4/2011 |
| TW | 200540528 A | 12/2005 |
| TW | M366124 U | 10/2009 |
| TW | M393699 U1 | 12/2010 |

\* cited by examiner

*Primary Examiner* — Thanh Luu
(74) *Attorney, Agent, or Firm* — Cheng-Ju Chiang

(57) ABSTRACT

A light path adjusting assembly includes a supporting component and a light path adjusting component. The supporting component includes a mounting portion, a light transmission portion and a connecting portion. The light transmission portion faces to the mounting portion. The connecting portion is located between and is connected to the mounting portion and the light transmission portion, thereby forming a receiving space between the mounting portion and the light transmission portion. The light path adjusting component is disposed in the receiving space. An optical touch device using the light path adjusting assembly is also provided. The light path adjusting assembly and the optical touch device have a simple manufacturing process and a high production yield.

12 Claims, 3 Drawing Sheets

LIGHT PATH ADJUSTING ASSEMBLY AND OPTICAL TOUCH DEVICE USING THE SAME

TECHNICAL FIELD

The present invention relates to an optical touch device, and more particularly to a light path adjusting assembly and an optical touch device using the light path adjusting assembly.

BACKGROUND

A touch device has an advantage of easy operation. Recently, the touch device has been widely applied to various electronic products, for example, mobile telephones, personal digital assistants (PDAs), digital cameras, music players, computers, satellite navigation devices, touch screens, and so on. Generally, a familiar type of the touch device is, for example, a resistive touch device, a capacitive touch device or an optical touch device. The optical touch device has been paid attention to because the optical touch device has a durable property and a lower cost comparative to the resistive touch device or the capacitive touch device.

The optical touch device has a sensing region. It is necessary to provide light to the sensing region so that a sensing component can sense a position of a touch point in the sensing region. Typically, a light reflecting bar or a light guide bar is used for guiding a light beam from a light emitting component to the sensing region.

FIG. 1 is a partial, cross-sectional, schematic view of a conventional optical touch device using the light reflecting bar. Referring to FIG. 1, in an optical device 100, a light reflecting bar 130 is fixed to a plastic bar 140 via a double faced adhesive 150a, and the plastic bar 140 is fixed to a frame 110 via a double faced adhesive 150b and is fixed to a substrate 135 via a double faced adhesive 150c. The light reflecting bar 130 has a surface facing to a sensing region 102. A filter coating 120 is formed on the surface facing to the sensing region 102. For example, an infrared light can pass through the filter coating 120 while other light other than the infrared light can be filtered out by the filter coating 120.

Typically, in order to increasing a reflective efficiency of the light reflecting bar 130, a hot melt cutting process is applied to the light reflecting bar 130 and the filter coating 120. However, the hot melt cutting process is complicated, thereby causing a high production cost of the optical touch device 100. In addition, when the light reflecting bar 130 is fixed to the plastic bar 140 via the double faced adhesive 150a, it is difficult to exactly control an adhering position of the light reflecting bar 130. Thus, it is necessary to rework many times till the light reflecting bar 130 is exactly fixed to the plastic bar 140, thereby reducing a production yield of the optical touch device 100.

SUMMARY

Therefore, the present invention provides a light path adjusting assembly so as to increase a production yield.

Therefore, the present invention provides an optical touch device so as to increase a production yield.

The present invention provides a light path adjusting assembly, which includes a supporting component and a light path adjusting component. The supporting component includes a mounting portion, a light transmission portion and a connecting portion. The light transmission portion faces to the mounting portion. The connecting portion is located between and is connected to the mounting portion and the light transmission portion, thereby forming a receiving space between the mounting portion and the light transmission portion. The light path adjusting component is disposed in the receiving space.

In one embodiment provided by the present invention, a material of the light transmission portion is a filter material, and the filter material is configured for making a light in a specific wavelength range pass through.

In one embodiment provided by the present invention, the light in the specific wavelength range is an infrared light.

In one embodiment provided by the present invention, a material of the mounting portion and a material of the light transmission portion each are a transparent material.

In one embodiment provided by the present invention, a material of the mounting portion is a light shading material and a material of the light transmission portion is a transparent material.

In one embodiment provided by the present invention, the mounting portion includes at least a positioning structure disposed on a surface thereof.

In one embodiment provided by the present invention, the light path adjusting component is a light reflecting bar or a light guiding bar.

In one embodiment provided by the present invention, an extending direction of the receiving space is parallel to a lengthwise direction of the supporting component.

In one embodiment provided by the present invention, the mounting portion, the light transmission portion and the connecting portion are integrally formed.

The present invention also provides an optical touch device, which has a sensing region. The sensing region includes a number of sides. The optical touch device includes a frame surrounding the sensing region and a number of light path adjusting assemblies. The light path adjusting assemblies are respectively disposed beside the sides of the sensing region. The light transmission portion of each of the light path adjusting assemblies faces to the sensing region. Each of the light path adjusting assemblies includes a supporting component and a light path adjusting component. The supporting component includes a mounting portion, a light transmission portion and a connecting portion. The light transmission portion faces to the mounting portion. The connecting portion is located between and is connected to the mounting portion and the light transmission portion, thereby forming a receiving space between the mounting portion and the light transmission portion. The light path adjusting component is disposed in the receiving space.

In one embodiment provided by the present invention, the frame includes a side wall surrounding the sensing region, and a top plate adjacent to the side wall. The top plate covers the light path adjusting assemblies. The mounting portion of the supporting component of each of the light path adjusting assemblies is fixed to at least one of the side wall and the top plate.

In one embodiment provided by the present invention, the supporting component is fixed to the frame via an adhesive.

In one embodiment provided by the present invention, the mounting portion includes at least a first positioning structure, the frame includes at least a second positioning structure matched with the first positioning structure. The first positioning structure is cooperated with the second positioning structure correspondingly so that the mounting portion is fixed to the frame.

In one embodiment provided by the present invention, the optical touch device further includes a substrate, and the light path adjusting assemblies are disposed on the substrate.

In one embodiment provided by the present invention, the optical touch device further includes a display panel, and the light path adjusting assemblies are disposed on the display panel.

In the light path adjusting assembly of the present invention, the mounting portion of the supporting component is connected to the light transmission portion of the supporting component by the connecting portion of the supporting component, thereby forming the receiving space between the mounting portion and the light transmission portion for receiving the light path adjusting component. Thus, assembling the light path adjusting assembly only needs to insert the light path adjusting component into the receiving space. The position of the light path adjusting component can be easily and exactly controlled. Because the light path adjusting component is fixed to the supporting component without adhesive, the disadvantages caused by using the adhesive can be avoided. Thus, the production yield of the light path adjusting assembly and the production yield of the optical touch device using the light path adjusting assembly can be increased.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
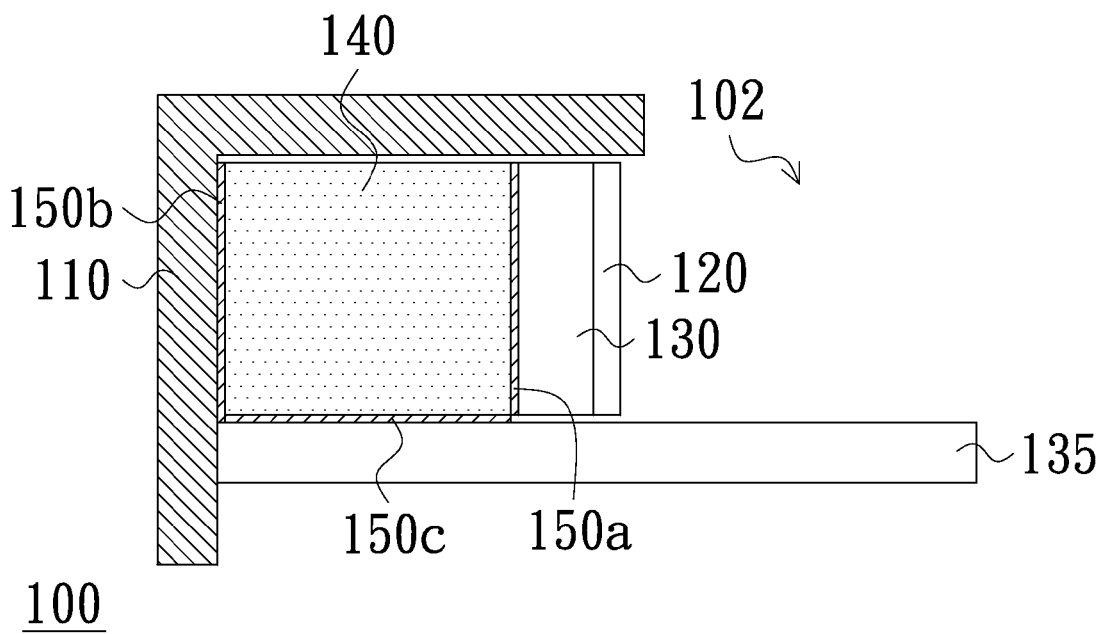
FIG. 1 is a partial, cross-sectional, schematic view of a conventional optical touch device using the light reflecting bar.
Figure 2:
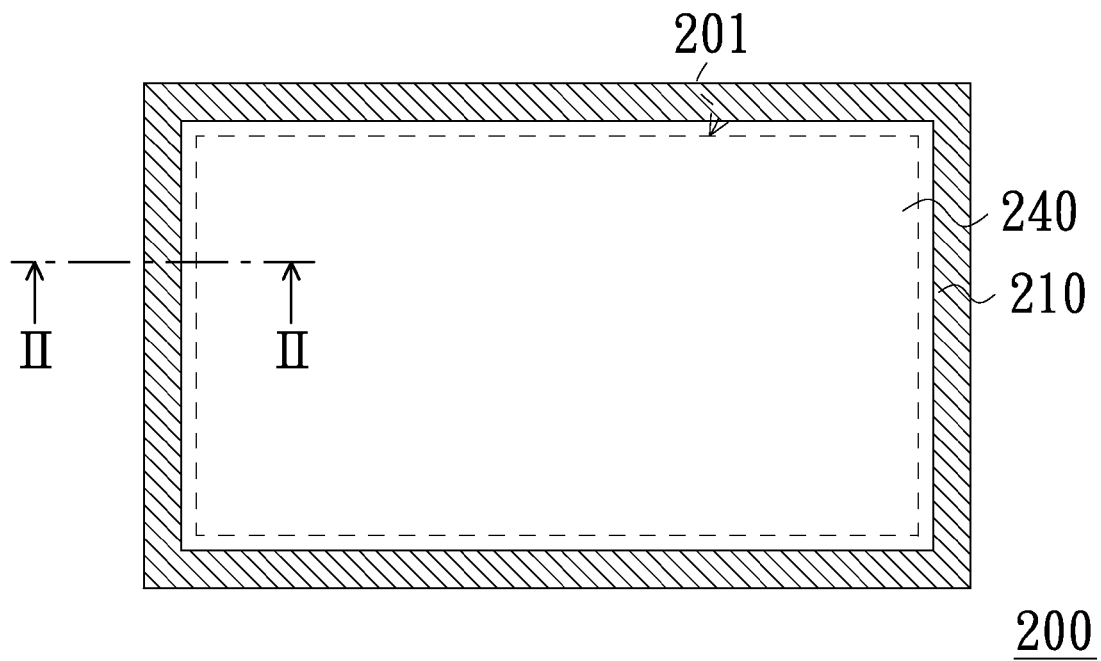
FIG. 2 is a top, schematic view of an optical touch device in accordance with an embodiment of the present invention.
Figure 3:
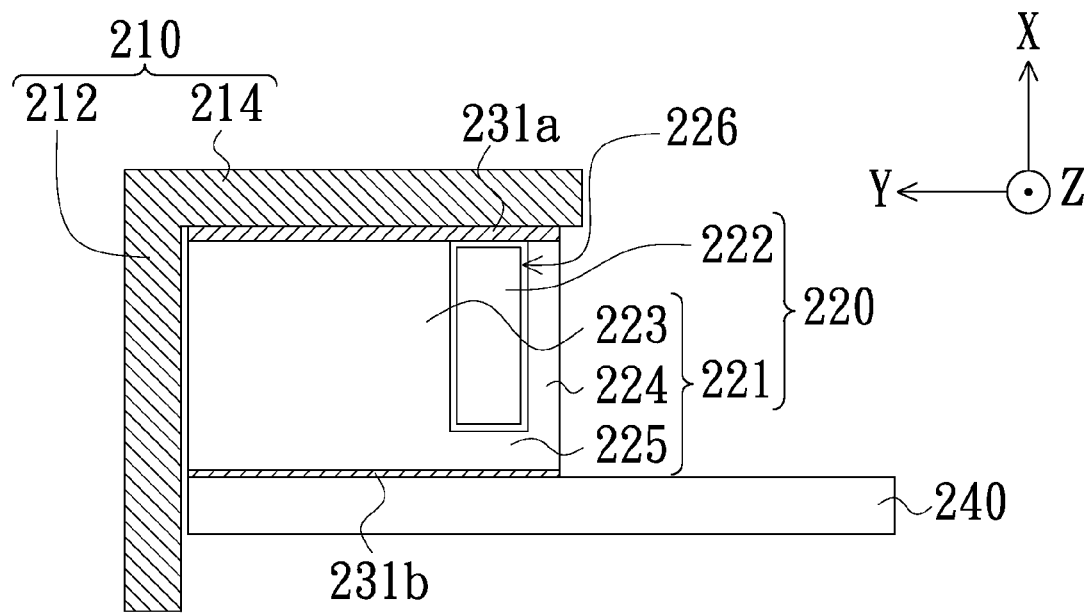
FIG. 3 is a cross-sectional, schematic view of the optical touch device shown in FIG. 2 along a line II-II.

FIG. 2 is a top, schematic view of an optical touch device in accordance with an embodiment of the present invention. FIG. 3 is a cross-sectional, schematic view of the optical touch device shown in FIG. 2 along a line II-II. Referring to FIG. 2 and FIG. 3, an optical touch device 200 has a sensing region 201, and includes a frame 210 surrounding the sensing region 201 and a number of light path adjusting assemblies 220. The frame 210 is, for example, a plastic frame or a metal frame. The frame 210 includes a side wall 212 surrounding the sensing region 201 and a top plate 214 adjacent to the side wall 212. In the present embodiment, the sensing region 201 and the top plate 214 of the frame 210 each are, but not limited to, for example, rectangular. The sensing region 201 has a number of sides (not labeled). The light path adjusting assemblies 220 are disposed beside the sides of the sensing region 201 correspondingly. The light path adjusting assemblies 220 are fixed to the frame 210 and are covered by the top plate 214 of the frame 210. In the present embodiment, one of the light path adjusting assemblies 220 is disposed beside one of the sides of the sensing region 201. It is noted that, the number of the light path adjusting assemblies 220 beside one of the sides of the sensing region 201 is not limited by the present embodiment, and can be adjusted according to the demand.

Each of the light path adjusting assemblies 220 includes a supporting component 221 and a light path adjusting component 222 cooperated with the supporting component 221. The supporting component 221 includes a mounting portion 223, a light transmission portion 224 and a connecting portion 225. The mounting portion 223 is fixed to the frame 210. In the present embodiment, the mounting portion 223 is fixed to the top plate 214 of the frame 210 via an adhesive 231a. It is noted that, the mounting portion 223 can also be fixed to the side wall 212 of the frame 210 via an adhesive. A material of the mounting portion 223 is, for example, a transparent material. Two sides of the light transmission portion 224 respectively face to the mounting portion 223 and the sensing region 201 of the optical touch device 200. A material of the light transmission portion 224 is also, for example, a transparent material. The connecting portion 225 is located between the mounting portion 223 and the light transmission portion 224, and is connected to the mounting portion 223 and the light transmission portion 224, thereby forming a receiving space 226 between the mounting portion 223 and the light transmission portion 224. An extending direction of the receiving space 226 is parallel to a lengthwise direction of the supporting component 221. As shown in FIG. 3, the extending direction of the receiving space 226 and the lengthwise direction of the supporting component 221 each are parallel to the Z axis. The receiving space 226 is matched with the light path adjusting component 222 so as to receive the light path adjusting component 222 therein. In addition, the mounting portion 223, the light transmission portion 224 and the connecting portion 225 are integrally formed by using an injection molding method. In order to manufacture the supporting component 221, in the present embodiment, a material of the connecting portion 225 can be identical to the mounting portion 223 and the light transmission portion 224. That is, the material of the connecting portion 225 is also a transparent material. It is noted that, the material of the supporting component 221 can also be a filtering material for making a light in a specific wavelength range pass through. The light in the specific wavelength range can be sensed by a sensing component (not shown) of the optical touch device 200. For example, when the sensing component of the optical touch device 200 is configured for sensing an infrared light, the filter material of the supporting component 221 is used for making the infrared light pass through and filtering out the light other than the infrared light.

The light path adjusting component 222 is disposed in the receiving space 226 of the supporting component 221. In the present embodiment, the light path adjusting component 222 is, for example, but not limited to, a light reflecting bar. In another embodiment, a light guiding bar can be used as the light path adjusting component 222. In one embodiment, in order to exactly fix the light path adjusting component 222 in the receiving space 226, the configuration and the size of the receiving space 226 is substantially identical to the configuration and the size of the light path adjusting component 222. Thus, a tight fit between the light path adjusting component 222 and the receiving space 226 can be achieved. That is, the light path adjusting component 222 in the receiving space 226 is contacted with the mounting portion 223, the light transmission portion 224 and the connecting portion 225.

In the present embodiment, the optical touch device 200 further includes a substrate 240. The light path adjusting assemblies 220 are disposed on the substrate 240. For example, the light path adjusting assemblies 220 can be fixed to the substrate 240 via an adhesive 231b. In the present embodiment, the substrate 240 can be, but not limited to, a glass substrate or a plastic substrate. In another embodiment, the optical touch device 200 further includes a display panel substituting for the substrate 240. The sensing region 201 of the optical touch device 200 is, for example, disposed on a displaying surface of the display panel. The display panel can be, but not limited to, a liquid crystal display panel, a plasma display panel or a bistable display panel.

In the present embodiment, because the light path adjusting component 222 of the light path adjusting assembly 220 can be insert into the receiving space 226 to be fixed. The position of the light path adjusting component 222 can be easily and exactly controlled. The light path adjusting component 222 is fixed to the supporting component 221 without adhesive, and thus the disadvantages caused by using the adhesive can be avoided. In addition, the light path adjusting component 222 is directly received in the receiving space 226 of the supporting component 221 having the light transmission portion 224. Thus, it is not necessary to apply a hot melt cutting process to the light path adjusting component 222 and the transparent/filtering material, thereby simplifying the processes of manufacturing the light path adjusting assembly 220 and the optical touch device 200. As a result, the production yield of the light path adjusting assembly 220 and the production yield of the optical touch device 200 using the light path adjusting assembly 220 can be increased.

Figure 4:
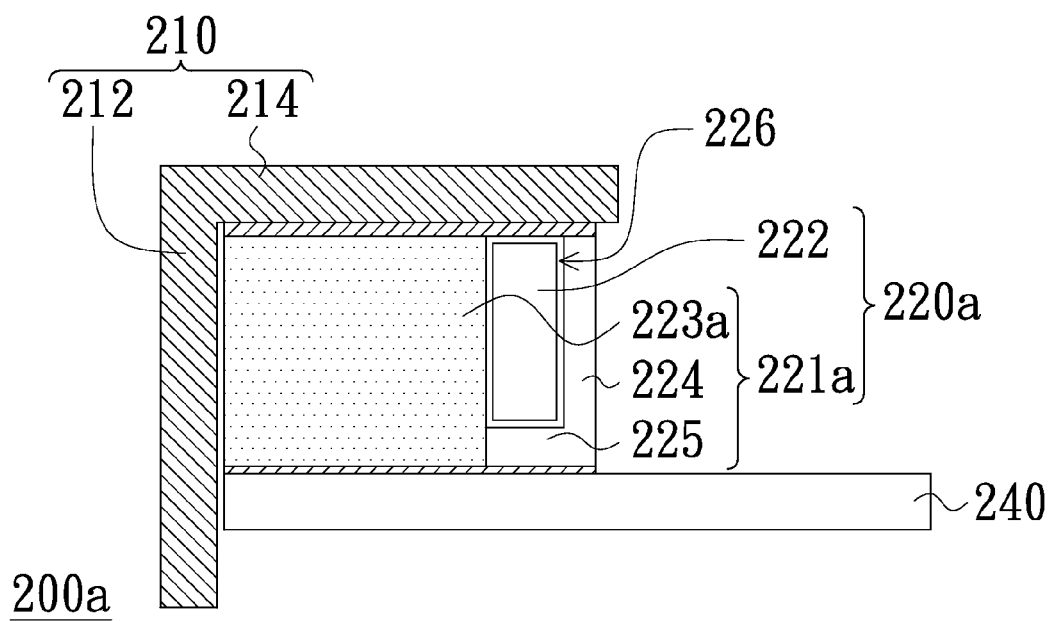
FIG. 4 is a partial, cross-sectional, schematic view of an optical touch device in accordance with another embodiment of the present invention.

FIG. 4 is a partial, cross-sectional, schematic view of an optical touch device in accordance with another embodiment of the present invention. Referring to FIG. 4, in the present embodiment, an optical touch device 200a is similar to the optical touch device 200 except that a material of the supporting component 221a of the light path adjusting assembly 220a. In the present embodiment, in the light path adjusting assembly 220a, a material of the mounting portion 223a is a light shading material such as an opaque plastic material, and a material of the light transmission portion 224 is a transparent material. It is noted that, the material of the light transmission portion 224 can also be the filter material mentioned in the aforesaid embodiment. In the present embodiment, the mounting portion 223a, the light transmission portion 224 and the connecting portion 225 are also integrally formed by using an injection molding method. In order to manufacture the supporting component 221a, in the present embodiment, a material of the connecting portion 225 can be identical to the material of one of the mounting portion 223a or the light transmission portion 224. That is, the material of the connecting portion 225 can be the light shading material or the transparent material. In the present embodiment, the material of the connecting portion 225 is identical to the material of the light transmission portion 224, and is the transparent material.

Figure 5:
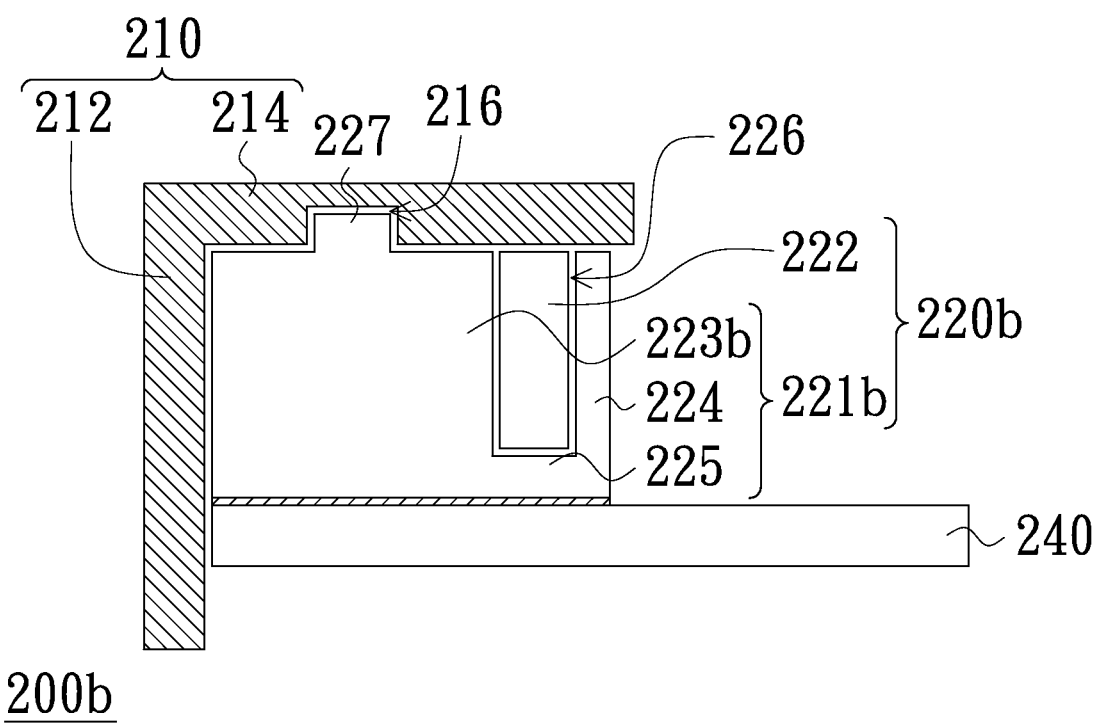
FIG. 5 is a partial, cross-sectional, schematic view of an optical touch device in accordance with still another embodiment of the present invention.

FIG. 5 is a partial, cross-sectional, schematic view of an optical touch device in accordance with still another embodiment of the present invention. Referring to FIG. 5, in the present embodiment, an optical touch device 200b is similar to the optical touch device 200 except that a fixed mode of a supporting component 221b of a light path adjusting assembly 220b. In the present embodiment, in the light path adjusting assembly 220b, a mounting portion 223b of the supporting component 221 includes at least a first positioning structure 227 (only one first positioning structure 227 is illustrated in FIG. 5). The first positioning structure 227 is disposed on a surface (not labeled) of the mounting portion 223b. The surface of the mounting portion 223b for disposing the first positioning structure 227 thereon faces to the frame 210. The frame 210 further includes at least a second positioning structure 216 (only one second positioning structure 216 is illustrated in FIG. 5) matched with the first positioning structure 227 correspondingly. The first positioning structure 227 is cooperated with the second positioning structure 216 so that the mounting portion 223b of the supporting component 221b is fixed to the frame 210. In the present embodiment, the first positioning structure 227 is disposed on the surface of the mounting portion 223b and face to a top plate 214 of the frame 210. Each of the first positioning structure 227 is a protruding structure. The second positioning structure 216 is disposed on the top plate 214 of the frame 210 corresponding to the first positioning structure 227. The second positioning structure 216 is a recess structure matched with the protruding structure. Thus, the protruding structure of the first positioning structure 227 can insert into the recess structure of the second positioning structure 216 so that the mounting portion 223b of the supporting component 221b is fixed to the frame 210. It is noted that, the second positioning structure 216 can also be disposed on a side wall 212 of the frame 210. The position of the first positioning structure 227 can be changed with the position of the second positioning structure 216. In addition, in another embodiment, the first positioning structure 227 can be a recess structure, and the second positioning structure 216 can be a protruding structure.

In the present embodiment, not only the light path adjusting component 222 of the light path adjusting assembly 220b can be fixed to the supporting component 221b without adhesive, but also the supporting component 221b can be fixed to the frame 210 without adhesive. The cooperation of the first positioning structure 227 and the second positioning structure 216 can make the supporting component 221b be exactly fixed to the frame 210. Thus, the disadvantages caused by using the adhesive can be avoided. As a result, the production yield of the light path adjusting assembly 220b and the production yield of the optical touch device 200b using the light path adjusting assembly 220b can be further increased.

In summary, in the light path adjusting assembly and the optical touch device using the light path adjusting assembly of the present invention, the supporting component of the light path adjusting assembly has the receiving space for receiving the light path adjusting component. Thus, the light path adjusting component can be fixed to the supporting component without adhesive, and the disadvantages caused by using the adhesive can be avoided. That is, assembling the light path adjusting assembly only needs to insert the light path adjusting component into the receiving space. The position of the light path adjusting component can be easily and exactly controlled. Thus, the production yield of the light path adjusting assembly and the production yield of the optical touch device using the light path adjusting assembly can be increased. In addition, it is not necessary to apply a hot melt cutting process to the light path adjusting component and the transparent/filtering material, thereby simplifying the processes of manufacturing the light path adjusting assembly and the optical touch device. As a result, the production yield of the light path adjusting assembly and the production yield of the optical touch device using the light path adjusting assembly can be further increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch device, which defines a sensing region having a plurality of sides, comprising:
   a frame surrounding the sensing region; and
   a plurality of light path adjusting assemblies respectively disposed beside the sides of the sensing region, each of the light path adjusting assemblies comprising:
      a supporting component having a lengthwise direction, comprising:
         a mounting portion fixed to the frame, the mounting portion longitudinally extending along the lengthwise direction;
         a light transmission portion longitudinally extending along the lengthwise direction, two sides of the light transmission portion facing to the mounting portion and the sensing region respectively; and
         a connecting portion located between the mounting portion and the light transmission portion, the connecting portion longitudinally extending along the lengthwise direction and being connected to the mounting portion and the light transmission portion, thereby forming a receiving space between the mounting portion and the light transmission portion; and
      a light path adjusting component disposed in and matched with the receiving space, wherein the light path adjusting component is a light reflecting bar.

2. The optical touch device according to claim 1, wherein the frame comprises a side wall surrounding the sensing region, and a top plate adjacent to the side wall, the top plate covering the light path adjusting assemblies, and the mounting portion of the supporting component of each of the light path adjusting assemblies is fixed to at least one of the side wall and the top plate.

3. The optical touch device according to claim 1, wherein the supporting component is fixed to the frame via an adhesive.

4. The optical touch device according to claim 1, wherein a material of the light transmission portion is a filter material, and the filter material is configured for making a light in a specific wavelength range pass through.

5. The optical touch device according to claim 4, wherein the light in the specific wavelength range is an infrared light.

6. The optical touch device according to claim 1, wherein the mounting portion comprises at least a first positioning structure disposed thereon, the frame comprises at least a second positioning structure matched with the first positioning structure, and the first positioning structure is cooperated with the second positioning structure correspondingly so that the mounting portion is fixed to the frame.

7. The optical touch device according to claim 1, wherein a material of the mounting portion and a material of the light transmission portion each are a transparent material.

8. The optical touch device according to claim 1, wherein a material of the mounting portion is a light shading material and a material of the light transmission portion is a transparent material.

9. The optical touch device according to claim 1, wherein an extending direction of the receiving space is parallel to the lengthwise direction of the supporting component.

10. The optical touch device according to claim 1, wherein further comprising a substrate, the light path adjusting assemblies being disposed on the substrate.

11. The optical touch device according to claim 1, wherein further comprising a display panel, the light path adjusting assemblies being disposed on the display panel.

12. The optical touch device according to claim 1, wherein the mounting portion, the light transmission portion and the connecting portion are integrally formed.

* * * * *